(12) United States Patent
Kessler

(10) Patent No.: US 11,156,817 B2
(45) Date of Patent: Oct. 26, 2021

(54) SCANNING MICROSCOPE WITH ENHANCED FOV AND NA

(71) Applicant: David Kessler, New York, NY (US)

(72) Inventor: David Kessler, New York, NY (US)

(73) Assignee: Kessler Optics and Photonics Solutions Ltd., Rochester, NY (US)

( * ) Notice: Subject to any disclaimer, the term of this patent is extended or adjusted under 35 U.S.C. 154(b) by 342 days.

(21) Appl. No.: 16/528,877

(22) Filed: Aug. 1, 2019

(65) Prior Publication Data

US 2020/0049967 A1    Feb. 13, 2020

Related U.S. Application Data

(60) Provisional application No. 62/715,833, filed on Aug. 8, 2018.

(51) Int. Cl.
G02B 21/00    (2006.01)

(52) U.S. Cl.
CPC ....... *G02B 21/0032* (2013.01); *G02B 21/006* (2013.01); *G02B 21/008* (2013.01); *G02B 21/0048* (2013.01)

(58) Field of Classification Search
CPC .............. G02B 21/0032; G02B 21/002; G02B 21/006; G02B 21/008; G02B 21/0048; G02B 21/0068; G02B 21/02; G02B 21/16; G02B 21/33; G02B 21/367; G02B 26/0833; G02B 26/101; G02B 27/141; G02B 27/145; H04N 5/2256
See application file for complete search history.

(56) References Cited

U.S. PATENT DOCUMENTS

| | | | |
|---|---|---|---|
| 8,274,720 B2 | 9/2012 | Kessler | |
| 8,531,750 B2 | 9/2013 | Kessler | |
| 2004/0246595 A1* | 12/2004 | Beach ................ | G02B 17/0824 359/728 |

(Continued)

OTHER PUBLICATIONS

Jonathan R. Bumstead, Jasmine J. Park, Isaac A. Rosen, Andrew W. Kraft, Patrick W. Wright, Matthew D. Reisman, Daniel C. Côté, Joseph P. Culver, "Designing a large field-of-view two-photon microscope using optical invariant analysis" Neurophotonics 5(2) 025001 pp. 1-20 (2018).

(Continued)

*Primary Examiner* — Mustak Choudhury
(74) *Attorney, Agent, or Firm* — Louis S. Horvath

(57) ABSTRACT

A scanning microscope apparatus has a laser light to generate a beam at an excitation wavelength. A beam expander enlarges the beam width and forms a collimated beam, scanned in a raster pattern. A catadioptric objective has a curved partially transmissive mirror surface symmetric about an optical axis and disposed to focus a portion of the received scanned collimated beam toward a focal plane at the sample, wherein the mirror surface has a center of curvature either at an axis of rotation of the scanner or at an image of the axis of rotation. A reflective polarizer cooperates with the curved mirror to direct the focused light toward the sample. One or more polarization retarders condition excitation light conveyed toward and away from the curved mirror. A beam splitter separates the generated laser light from a signal and directs the signal toward a detector.

18 Claims, 7 Drawing Sheets

(56) References Cited

U.S. PATENT DOCUMENTS

| | | | |
|---|---|---|---|
| 2006/0066873 A1* | 3/2006 | Hill | G01N 21/45 356/511 |
| 2007/0002465 A1* | 1/2007 | Chuang | G02B 21/10 359/726 |
| 2007/0273970 A1 | 11/2007 | Hoppe et al. | |
| 2016/0056606 A1* | 2/2016 | Chuang | G02F 1/353 355/67 |
| 2017/0123196 A1* | 5/2017 | Svoboda | G02B 21/0076 |
| 2018/0149862 A1 | 5/2018 | Kessler et al. | |

OTHER PUBLICATIONS

Congping Chen, Zhongya Qin, Sicong He, Caleb Lui, Nancy Y. Ip, et al., "Adaptive optics two-photon microscopy for in vivo imaging of cortex and hippocampus in mouse brain", Proc. SPIE 10865, Neural Imaging and Sensing 2019, 108650M (Mar. 1, 2019).

Debarre et al. "Image-based adaptive optics for two-photon microscopy" in Optical Letters 2009, 34(16) pp. 2495-2497.

Martin J. Booth, "Adaptive Optics in Microscopy" Philosophical Transactions of the Royal Society A: Mathematical, Physical and Engineering Sciences. 365 (1861): pp. 2829-2843 (2007).

Martin J. Booth, "Adaptive Optics in Microscopy" chapter in text: Optical and Digital Image Processing, G. Gristobal, P. Schelkens, & H. Thienpont (eds.) Wiley, 2011.

* cited by examiner

SCANNING MICROSCOPE WITH ENHANCED FOV AND NA

CROSS REFERENCE TO RELATED APPLICATIONS

Reference is made to, and priority is claimed from, U.S. Ser. No. 62/715,833, filed as a provisional patent application on Aug. 8, 2018, entitled "SCANNING MICROSCOPE WITH LARGE FOV AND HIGH NA", in the name of David Kessler, incorporated herein by reference.

FIELD OF THE INVENTION

The present disclosure relates to optical systems and more particularly to scanning microscope optics having improved field of view (FOV) and increased numerical aperture (NA).

BACKGROUND

Laser-scanning microscopy, used in two-photon microscopy and other types of multi-photon microscopy, uses a focused laser beam that is raster-scanned across a sample to excite fluorescent molecules for high-resolution imaging. Widely used in medical research and biological applications, multi-photon microscopy can create high-resolution images that show the response of living tissue under various conditions.

It has proven difficult to improve scanning microscope performance in order to provide both high resolution, with a numerical aperture (NA) of 0.5 or more, and a wide field of view (FOV). Characteristically, scanning microscope optics that have sufficiently high resolution are constrained to about 1-2 mm FOV.

Attempts to increase the FOV typically require fairly complex lens systems that can require significant complexity and expense in order to compensate for optical aberrations. This restricted FOV of existing systems, well below 10 mm with conventional optical approaches, can be particularly limiting in fields such as 2-photon microscopy, in which the object being scanned is a live organism, such as an animal cortex, for example.

Thus, there is a need for a scanning microscope objective that provides high resolution and enhanced FOV higher than 10 mm, with minimal aberration.

SUMMARY

It is an object of the present disclosure to advance the art of scanning microscopy.

According to one aspect of the disclosure, there is provided a scanning microscope apparatus for acquiring an image of a sample, comprising:
  a) a source of laser light energizable to generate a beam having a beam width and an excitation wavelength range;
  b) a beam expander configured to enlarge the beam width of the laser light and to direct a collimated beam along a beam path;
  c) a scanner in the beam path and energizable to scan the beam in a raster pattern;
  d) a catadioptric objective that is disposed to receive the scanned beam, wherein the catadioptric objective comprises:
    (i) a curved, partially transmissive mirror surface that is symmetric about an optical axis and disposed to focus a portion of the received scanned collimated beam toward a focal plane at the sample, wherein the mirror surface has a center of curvature either at an axis of rotation of the scanner or at an image of the axis of rotation of the scanner;
    (ii) a reflective polarizer that is disposed in the path of both collimated light of a first polarization state and focused light of an orthogonal polarization state, wherein the reflective polarizer is configured to cooperate with the curved mirror surface to direct the focused light toward the sample;
    (iii) one or more polarization retarders disposed along the optical axis to condition excitation light that is conveyed toward and away from the curved mirror surface;
  and
  e) a first beam splitter configured to separate the generated laser light from a signal that is excited from the sample and to direct the excited signal toward a detector.

These objects are given only by way of illustrative example, and such objects may be exemplary of one or more embodiments of the invention. Other desirable objectives and advantages inherently achieved may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION

Figure 1:
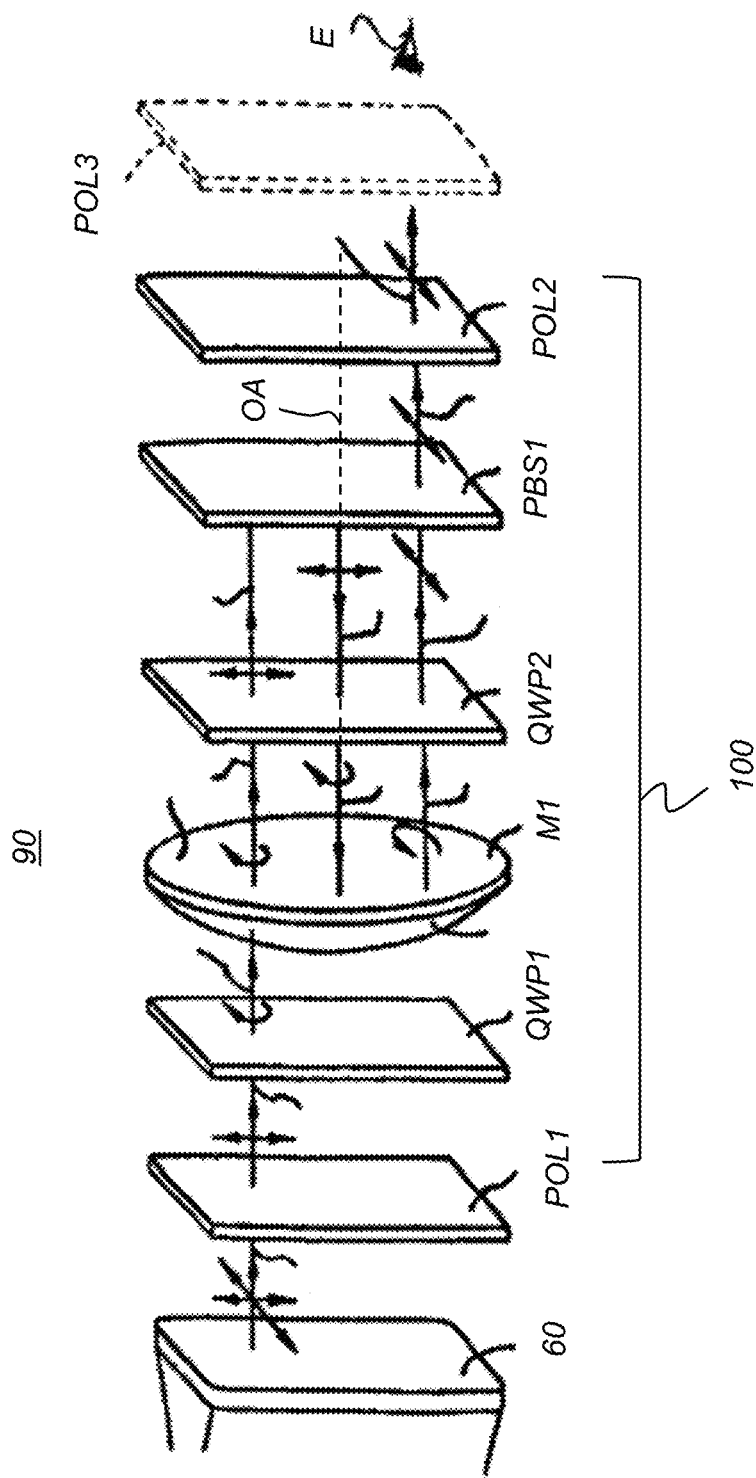
FIG. 1 is a schematic diagram that shows an exploded view of a conventional catadioptric "pancake" optical system.

The following is a detailed description of the preferred embodiments, reference being made to the drawings in which the same reference numerals identify the same elements of structure in each of the several figures.

In the drawings and text that follow, like components are designated with like reference numerals, and similar descriptions concerning components and arrangement or interaction of components already described are omitted. Where they are used, the terms "first", "second", and so on, do not necessarily denote any ordinal or priority relation, but are simply used to more clearly distinguish one element from another.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the term "energizable" describes a component or device that is enabled to perform a function upon receiving power and, optionally, upon also receiving an enabling signal.

In the context of the present disclosure, positional terms such as "top" and "bottom", "upward" and "downward", and similar expressions are used descriptively, to differentiate different surfaces or views of an assembly or structure and do not describe any necessary orientation of the assembly in an optical apparatus. The terms "upstream" and "downstream" as used herein have their conventional usage and refer to relative positions of light conveying or light conditioning components as the light proceeds along an optical path.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components.

The term "oblique", where used in the present disclosure, describes an angular relationship that is not parallel or normal, that is, other than an integer multiple of 90 degrees. In practice, two optical surfaces are considered to be oblique with respect to each other if they are offset from parallel or normal by at least about +/−2 degrees or more. Similarly, a line and a plane are considered to be oblique to each other if they are offset from parallel or normal by at least about +/−2 degrees or more. Substantially parallel planes are parallel to within +/−2 degrees. Likewise, substantially parallel beams are parallel to within about +/−2 degrees.

In the context of the present disclosure, the term "about", when used with reference to a measurement, means within expected tolerances for measurement error and inaccuracy that are accepted in practice. Some reasonable tolerance must be allowed, for example, for measurement differences in determining the extent of a particular viewer's visual field, as it would vary from the measurement of one practitioner to another.

The term "field of view" (FOV) in traditional microscopy relates to the field of view visible through the objective and the eyepiece. In laser scanning microscopy, FOV relates to the field (generally given in mm) that is acquired by the microscope optics and that may be processed and/or displayed. In the context of the present disclosure, the terms "field", "field of view", and FOV are used interchangeably.

The term Numerical Aperture (NA) in microscopy is given by:

$$NA = n * \sin(\alpha)$$

Where n is the refractive index of the immersed object and α is the semi-convergence angle at the image inside the immersed media. In the case of two-photon microscopy, used for brain research, for example, the medium is usually water and index n is about 1.33.

A "dichroic beam splitter," or simply a "dichroic" filter has different reflection and transmission characteristics depending on the wavelength of incident light.

The schematic diagram of FIG. 1 shows an exploded view of a basic conventional "pancake" optical system used in imaging applications, including use as an ocular in near-to-eye display. Embodiments of the present disclosure adapt, in part, some of the approach of conventional pancake optics, modified for use in scanning beam microscopy. References included in the present disclosure to "pancake" optics are understood to refer to a catadioptric optical objective 100 that is generally described with reference to FIG. 1, with appropriate changes for adaptation to multiphoton scanning microscopy.

A conventional pancake optical system uses polarization for folding the light path of the modulated beam back upon itself and employs reflective focusing optics with a curved mirror M1. Curved mirror M1 defines an optical axis OA, which may be a folded axis as shown in subsequent embodiments. The conventional image source 60 is a cathode-ray tube or other emissive surface that provides a two-dimensional (2-D) image field. Image source 60 is positioned at the front focal surface of partially transmissive curved mirror M1, along an optical path that is folded by a polarization beam splitter. A collimated beam is provided to a viewer's eye E from every field point.

Using the FIG. 1 model, the pancake optics system 90 works as follows: unpolarized light of a modulated beam from the CRT or other image source 60 is linearly polarized by polarizer POL1 and converted to a left-hand circularly polarized light by quarter wave plate QWP1. A portion of the beam is conveyed through semi-transparent curved mirror M1; half of the light is reflected and lost. Mirror M1 is considered to be "partially transmissive" or "semi-transmissive" or "semi-transparent", so that it transmits at least about 35% of the incident light from QWP1, preferably transmitting 50% of the incident light and reflecting 50% for peak efficiency.

The transmitted circularly polarized light goes through another QWP2 to become vertically linearly polarized light and is directed to a reflective polarizer, polarization beam splitter PBS1, which reflects most of the light back towards the curved mirror M1. Reflected light from PBS1 is conveyed through QWP2 again to become right-hand circularly polarized upon reflection. The curved mirror M1 again reflects about half of the light and loses the other half from transmission. The reflected polarized light from mirror M1 is now left-hand circularly polarized and is converted by quarter wave plate QWP2 into horizontally polarized light. Light with this polarization transmits through the reflective polarizer or polarization beam splitter PBS1 and through an optional cleaning polarizer POL3 into the eye E of the viewer.

In spite of seemingly complex polarization and light-directing mechanisms, pancake optics function well, with high resolution and capable of providing larger fields due to the high degree of symmetry about the optical axis, but with the penalty of considerable loss of more than 75% of the light originally generated from the light source 60. This inefficiency and substantial loss of light makes the pancake optical configuration unusable for applications demanding high transmission efficiency and can compromise the capability to detect very weak signals in some applications. For these and other reasons, catadioptric solutions based on the FIG. 1 model have not previously been adapted for use with multiphoton imaging systems.

Advantageously, the pancake optical configuration uses the mirror on axis, without the need to provide other means for separating the input beams into the mirror from the output beams and without the requirement for folding one or another portion of the optical path for image-forming. Conventional techniques employ a beam splitter for light path redirection between the eye and the mirror as is done, for example, in the Google-Glass™ system by Google, Inc. or by tilting the curved mirror, thereby introducing large off axis aberrations.

Thus, in spite of some drawbacks, the pancake design has the potential advantage of higher resolution over a larger field of view (FOV) as compared to a tilted mirror system. The pancake optical design of the present disclosure can have reduced size, with better eye relief as compared to single mirror system using a splitter. The pancake design has no off-axis aberrations.

As noted previously in the background section, FOV values for conventional laser scanning microscope apparatus are generally low, ranging from a few mm to no more than about 10 mm; at large field sizes, the NA is usually reduced to about 0.2.

As is well known in microscopy, the higher the NA, the higher the lateral resolution. It is common to define the lateral resolution of the microscope as the semi diameter r of its point spread function PSF (or the Airy disc, a phenomenon familiar to those skilled in the optical arts). The relationship between NA and r, for a given wavelength λ, is given by:

$$r = 0.61 \frac{\lambda}{NA}$$

Thus, a microscope with an objective having an NA of 0.5 will have a lateral resolution, at 800 nm wavelength, of 1 micron.

Embodiments of the present disclosure adapt the catadioptric approach of pancake optics to offer multiphoton and fluorescent scanning microscope capability and offer an increased FOV, allowing FOV values as high as about 20 mm, while maintaining a high NA. In order to provide this function, embodiments of the present disclosure implement various solutions that adapt pancake optics design to the demanding requirements of scanning and multiphoton imaging.

Embodiment #1

Figure 2:
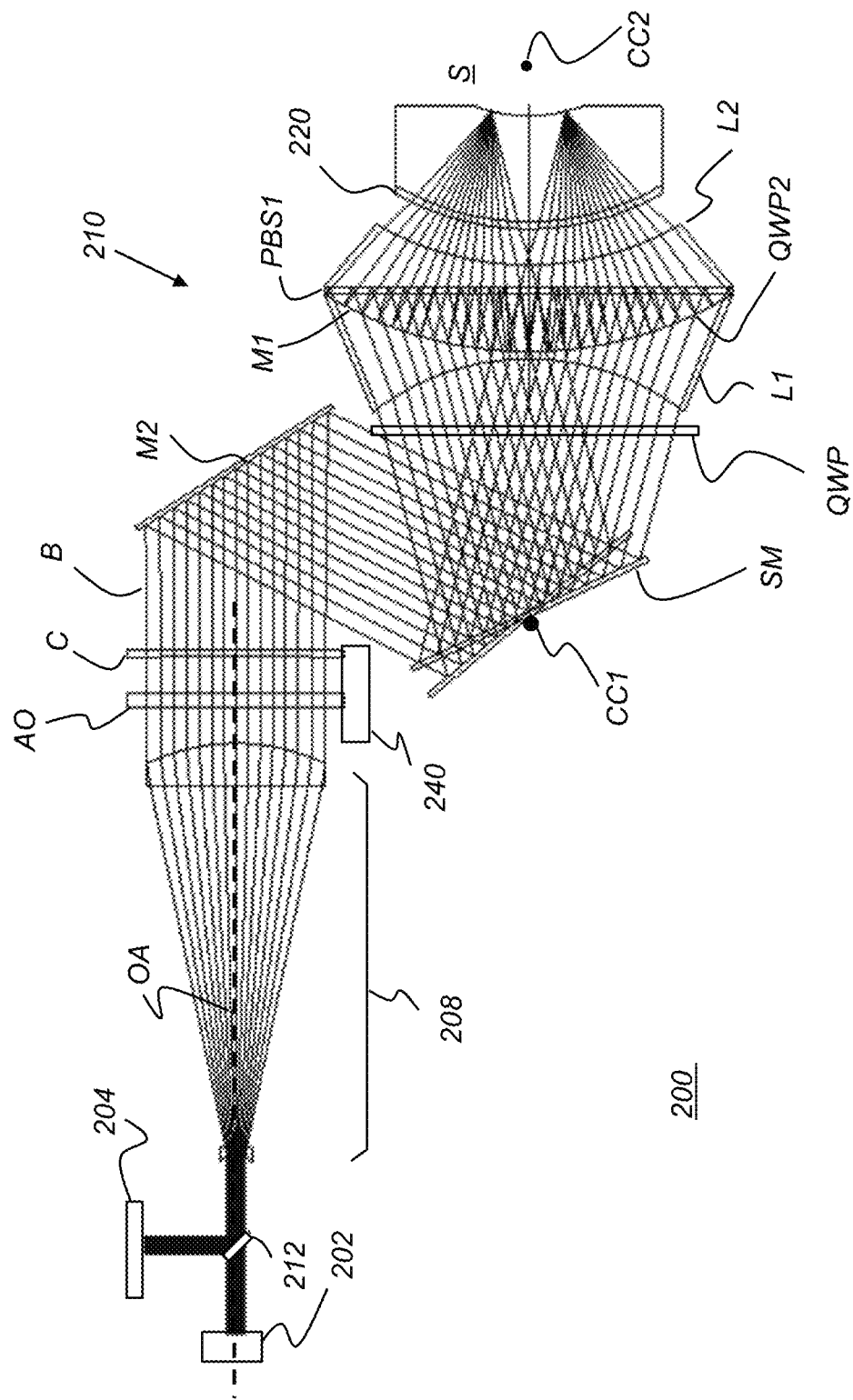
FIG. 2 is a schematic diagram that shows an embodiment of a scanning microscope using a catadioptric objective that adapts portions of the pancake optics model of FIG. 1 for enhanced FOV microscopy.

The schematic diagram of FIG. 2 shows an embodiment of a scanning microscope 200 using a catadioptric objective 210 that adapts portions of the pancake optics model of FIG. 1 for enhanced FOV microscopy. A laser light source 202 is energizable to direct a laser beam through a dichroic beam splitter 212 and to a beam expander 208 that increases the width of the generated laser light to form an expanded-width beam B. The light passes through an adaptive optical element AO and an aspheric corrector C and can be folded toward a scanning mirror SM by a mirror M2. For two-photon microscopy, the generated laser light used to excite materials in the sample S is typically in the infrared (IR) region.

Scanning mirror SM can be a Fast Steering Mirror from Objects in Motion LLC, Long Beach, Calif., for example. Scanning mirror SM directs the light through a QWP to objective lens 210. Light is incident on a concave lens L1 that has a surface concentric with a center of curvature CC1 at scanning mirror SM; the light is conveyed to partially reflective curved mirror M1. The transmitted portion of this light is directed through polarization retarder QWP2 and to reflective polarizing beam splitter PBS1, which can be a wire-grid polarizer, for example. Alternately, a highly reflective polarizer, such as the 3M™ Advanced Polarizing Film from 3M, Inc., Minneapolis, Minn. could be used. Linearly polarized light of one polarization state is reflected back to curved mirror M1 which provides lensing that focuses the light toward the object or sample S, having a curved, immersed surface. The focused beam for each scanning mirror SM angle goes through a curved cover glass CCG 220, which can be the cranial cover glass when an immersed object such as a mouse brain or other small animal brain is scanned as subject S.

Light that is excited as a response signal from the object or sample follows the excitation path in reverse of the generated light beam, conveyed back through objective 210, scanning mirror SM, and other components in the optical path. Beam expander 208 then condenses the generated sample light energy that is conveyed through the optical system in the opposite direction. Dichroic beam splitter 212 reflects light of the excited signal toward a detector 204 for forming image content indicative of response levels from sample S materials. In the case of two-photon microscopy, the collected, excited signal light has double the frequency (twice the wavelength) of the excitation light. For example, for IR excitation light at 800 nm, the collected signal light is at 400 nm. It is useful to observe that a similar optical approach could alternately be used in 1-photon imaging systems, or 3-photon imaging apparatus or in fluorescent microscopy, wherein the collected light from the sample is at a different wavelength compared to the excitation light from the laser source. The sampled wavelength is not necessarily doubled as in two-photon microscopy.

Centers of curvature CC1 and CC2 for the objective lens surfaces are indicated in the FIG. 2 schematic diagram. Center of curvature CC1 is the image of center CC2 at the focal point or focal plane of sample S and lies at the pivot point of scanning mirror SM. The concave incident surface of lens L1 is concentric with CC1. Surfaces of mirror M1, the curved surface of lens L2, and surfaces of cover glass 220, and the imaged object surface of the imaging system are all concentric with CC2.

Concentricity of surfaces to either center of curvature CC1 or CC2 ensures that the chief rays, the beam center rays, are normal to the surfaces at all scanning angles; given this relationship, no off-axis aberrations are generated. The only aberration present is spherical aberration, an on-axis aberration that can be corrected by the aspheric corrector C at the input beam. Concentricity is effected when component curvatures share the same center of curvature to within achievable optical precision, within practical tolerances as would be familiar to one skilled in the optical design arts. When surfaces are concentric, rays from, or to, the shared center of curvature are normal to each surface. In practice, surfaces would be considered concentric where a ray from the common center to the surfaces deviates from normal by no more than 5 degrees.

In the FIG. 2 configuration, adaptive optical element AO and aspheric corrector C can be shifted as a unit along the optical axis OA, translated by an actuator 240, optionally along with objective 210, in order to provide variable depth scanning. When this is done, the cover glass 220 may not retain its strict concentricity with center of curvature CC2; as a result, off-axis aberrations may be introduced, as well as spherical aberration changes. The adaptive optical element AO, which can be dynamically varied, is then used to adjust focus to compensate in real time for such variation in concentricity and to maintain scanner resolution.

Exemplary AO components, transmissive or reflective, include optics that allow temporally variable focus change and can include various AO solutions from Imagine Optic SA, Orsay, France or from Dynamic Optics SRL, Padova PD, Italy. As one example. the use of AO devices in microscopy is described in detail in an article by Debarre et al. entitled "Image-based adaptive optics for two-photon microscopy" in *Optical Letters* 2009, 34(16) pp. 2495-2497. Another reference for AO device use in microscopy applications is an article entitled "Adaptive Optics in Microscopy" by Martin J. Booth in *Philosophical Transactions of the Royal Society A: Mathematical, Physical and Engineering Sciences.* 365 (1861): pp. 2829-2843 (2007). Another resource for AO use is a chapter entitled "Adaptive Optics in Microscopy" in the textbook *Optical and Digital Image Processing*, G. Gristobal, P. Schelkens, & H. Thienpont (eds.) Wiley, 2011.

By way of example, a deformable mirror or membrane mirror or a deformable lens such as a liquid lens can be used as an AO element. Any suitable type of device that produces a changeable focusing or defocusing effect on the illuminating light energy can be considered to be suitable for use as an AO element.

Alternately, for depth imaging, instead of using the AO, while focusing the objective, one could change the curvature of the cranial cover to maintain its effective concentricity with surface L2 and with center of curvature CC2.

The collected signal light in the FIG. 2 embodiment, conveyed through the pancake objective 210, can be significantly attenuated by conveyance through the reflective polarizer PBS1 and after two passes through the transmissive curved mirror M1. While the signal collected is thus reduced, and will not be more than one eighth of the collected light within the NA of the system, this light is directed into a small detector 204. Thus, the collected signal can be conveyed to a detector with a low noise level. Because of this, the signal-to-noise or signal-to-background ratio may not be as significantly affected as is the signal itself.

Embodiment #2

Figure 3:
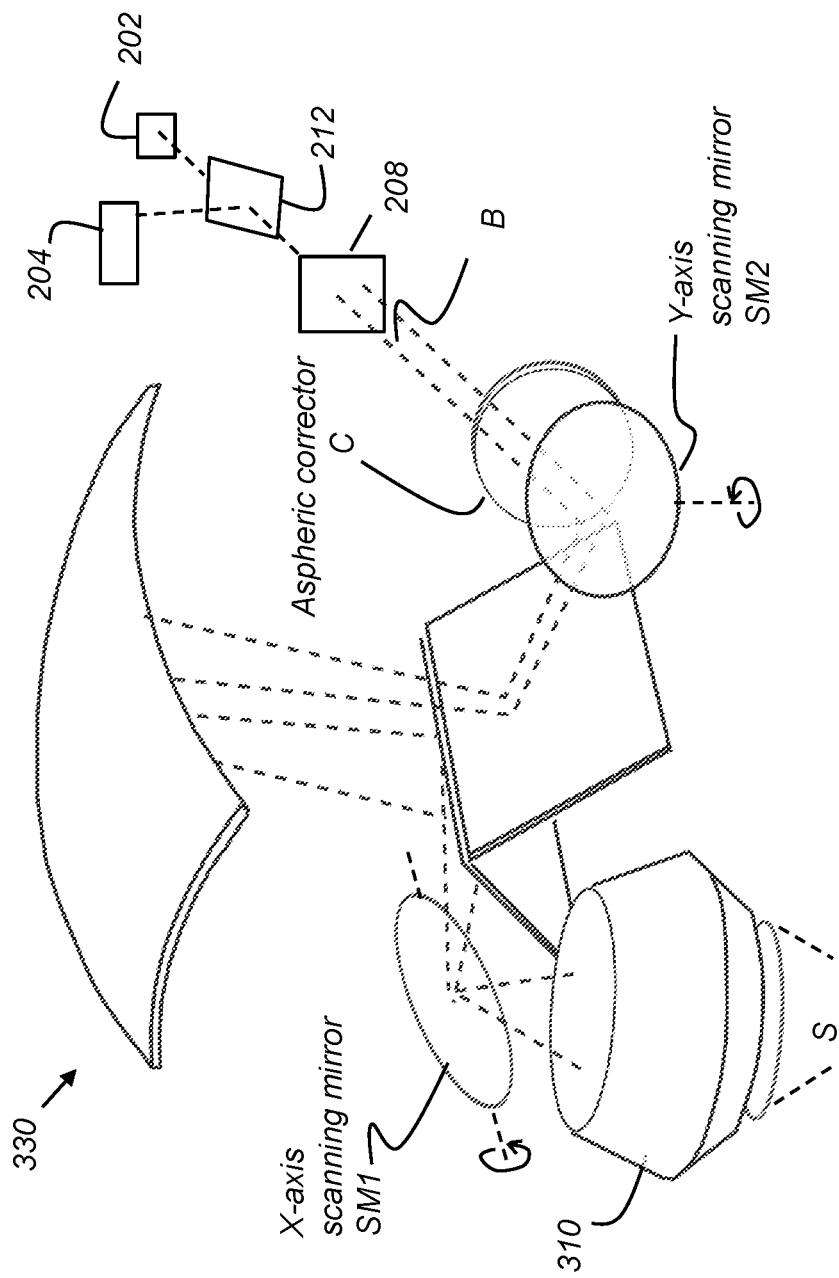
FIG. 3 is a schematic diagram that shows an embodiment of a scanning microscope that employs an afocal relay.

The schematic diagram of FIG. 3 shows a portion of a scanning microscope 300 that employs an afocal relay 330 in order to optically co-locate two linear or single-axis scan mirrors, namely an x-axis scanning mirror SM1 and a y-axis scanning mirror SM2 for scanning in the orthogonal direction. Beam B is directed, through aspheric corrector C, to y-axis scanning mirror SM2 for scanning along the y-axis direction. The scanned light goes to afocal relay 330, then to x-axis scanning mirror SM1, which directs the light to objective 310 and to the sample S. The light is conveyed to the sample S using an objective 310 that is formed according to the pancake optical model, similar to the objective 210 described with reference to the general pattern of FIG. 1 and to the embodiment of FIG. 2. Beam expander 208 and detector 204 of FIG. 2 could also be used, as shown.

Afocal relay 330 can be a relay apparatus as described in U.S. Pat. No. 8,274,720 to Kessler, entitled "Concentric Afocal Beam Relay" or in U.S. Pat. No. 8,531,750 to Kessler, entitled "Afocal Beam Relay".

In the FIG. 3 embodiment, curved surfaces within objective 310 are concentric as described for the FIG. 2 embodiment, with centers of curvature for lens and mirror surfaces coincident with the optical center shared by scanning mirrors SM1 and SM2 through afocal relay 330.

For the FIG. 3 arrangement, signal light that is excited as a response signal from the optical object or sample follows the excitation light path in reverse, conveyed through objective 310, scanning mirrors SM1 and SM2, relay 330, and other components in the optical path. As shown in the FIG. 2 embodiment and as used in the FIG. 3 embodiment, beam expander 208 condenses the generated signal light traveling along the beam path in the opposite direction. Dichroic splitter 212 similarly reflects light of the generated, excited signal from the sample A toward detector 204 for forming image content indicative of response levels.

Embodiment #3

Figure 4:
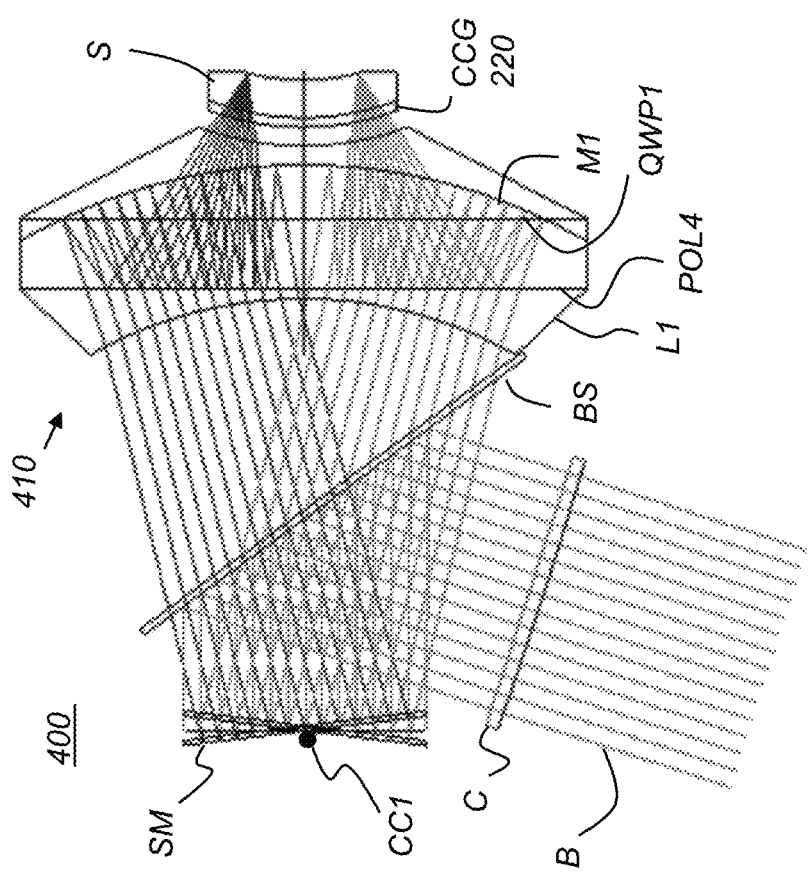
FIG. 4 is a schematic diagram that shows an embodiment of a scanning microscope with a component arrangement that reverses the sequence along the light path from that shown in the FIG. 2 embodiment.

The schematic diagram of FIG. 4 shows a scanning microscope 400 that employs a catadioptric objective 410 with a component arrangement that reverses some of the sequence along the light path from that shown in the FIG. 2 embodiment and eliminates the need for circularly polarized light, and corresponding QWP component, at the input to the pancake-optics objective 410. Beam B is linearly polarized, directed to scanning mirror SM through aspheric corrector C and a beam splitter BS.

In the FIG. 4 arrangement, the portion of the scanned light that is conveyed through beam splitter BS is incident on lens L1 of objective 410 and transmits through reflective polarizer POL4. Quarter wave plate QWP1 transforms this light to circularly polarized light, which reflects from partially reflective curved mirror M1 as orthogonally circularly polarized light that is focused, through reflection, onto the sample S. This reflected light is transformed by QWP1 to linearly polarized light, with polarization now orthogonal to the state of light incident at lens L1. The reflected, focused light reflects again from polarizer POL4. A portion of this light transmits through partial reflective mirror M1 and goes to the sample S.

Signal light that is excited at sample S follows the reverse path in order to be sensed at a detector, as was described previously with respect to the embodiments of FIGS. 2 and 3.

In addition to the reversing the sequence of some components within pancake objective 410 in the FIG. 4 arrangement, another feature is shown in regards to the scanning mirror SM. Scanning mirror SM is on-axis. The scanned beam is incident at the scanning mirror SM on axis due to the disposition of beam splitter BS. An advantage of using SM operation on axis with an incident beam at zero incidence angle is that the scan mirror that is used can be smaller. For example, compared to the FIG. 2 embodiment, in which the incident beam from M2 to SM is nominally at 30 degrees of the SM normal, surface dimensions of SM in FIG. 4 can be smaller by about 15% compared with the SM of FIG. 2.

Beam splitter BS can be a partially reflective beam splitter. Alternately, beam splitter BS can be a polarization beam splitter (PBS) paired with a QWP.

Embodiment #4

One difficulty that is inherent to use of the pancake optics model for a scanning microscope objective relates to reduced signal levels. As has been noted, the illumination that is conveyed through the catadioptric objective and focused on the sample S suffers significant losses due to partial transmission at the curved mirror M1 and polarization. In some embodiments, for example, somewhat less than 12.5% of the illumination energy is focused onto the sample S. This loss can be compensated by using a more powerful input beam.

Similar loss of signal light energy occurs for the emitted light from the sample S as it is conveyed to a detector (not shown in FIG. 4) through the catadioptric objective in the opposite direction. The resulting lower light levels of the excited light can compromise signal quality, typically expressed in terms of the ratio of signal to background noise, SBR or SBN. Noise reduction methods can help alleviate this problem; however, only some amount of noise elimination is possible. An embodiment of the present disclosure addresses this loss of signal energy by selectively adjusting the spectral response of components that form the objective.

Figure 5A:
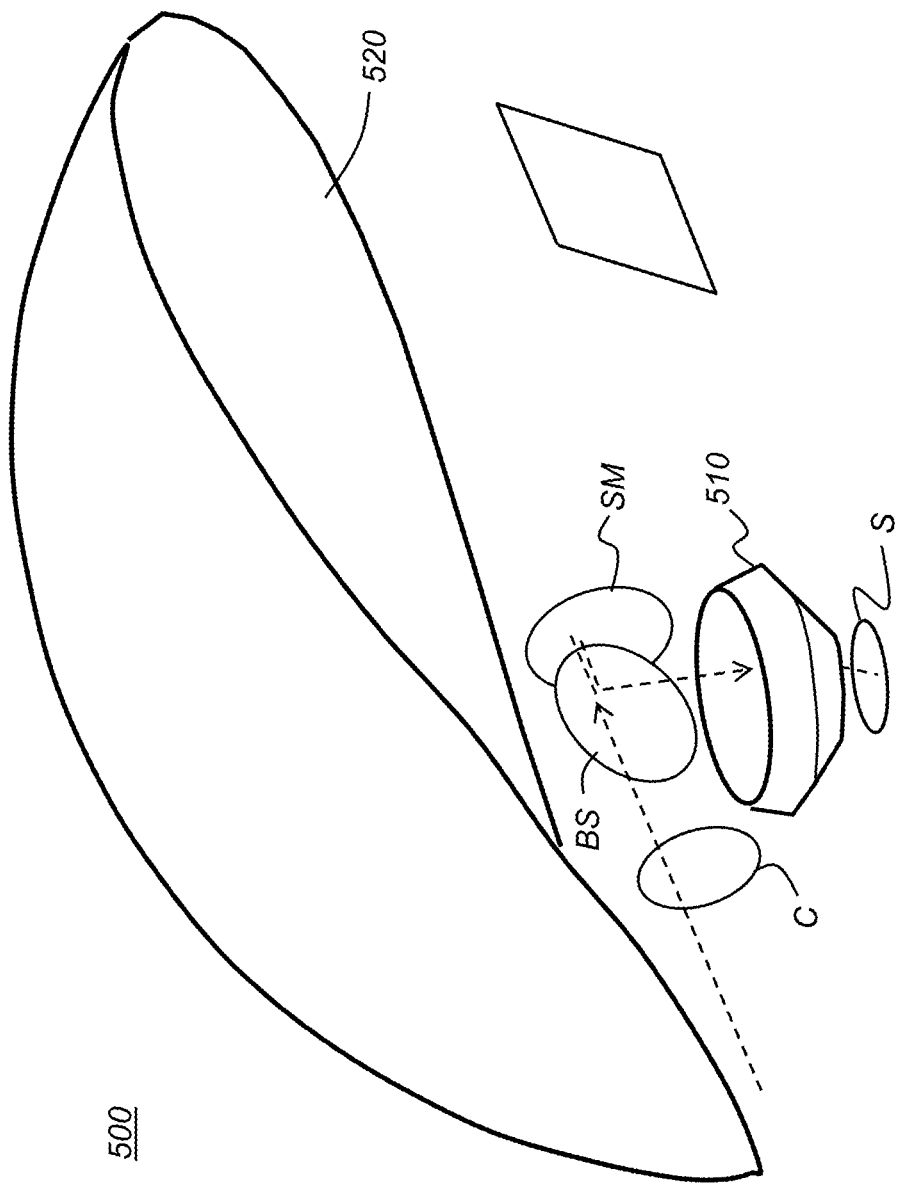
FIGS. 5A, 5B, and 5C are schematic diagrams that show an embodiment of a scanning microscope having components configured to provide high efficiency collection for the signal light.
Figure 5B:
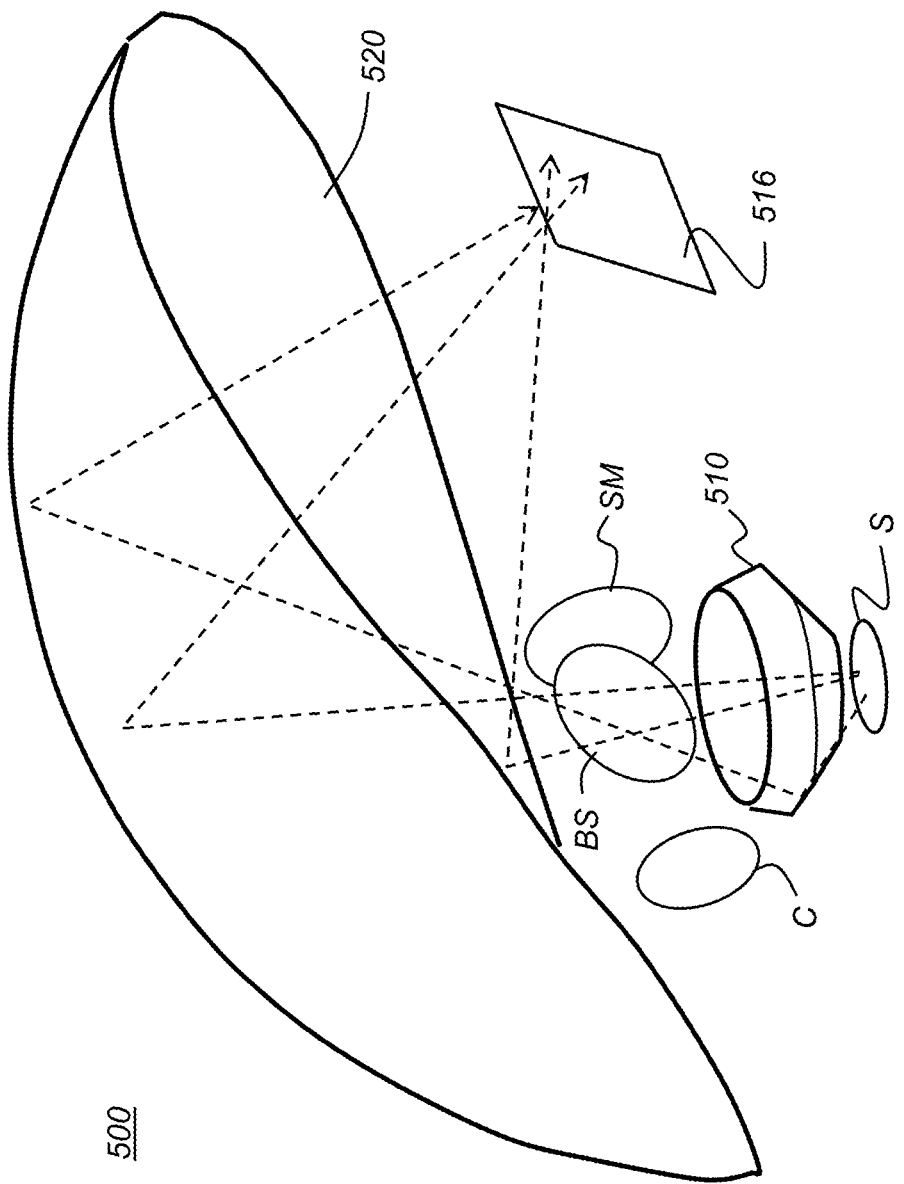
Figure 5C:
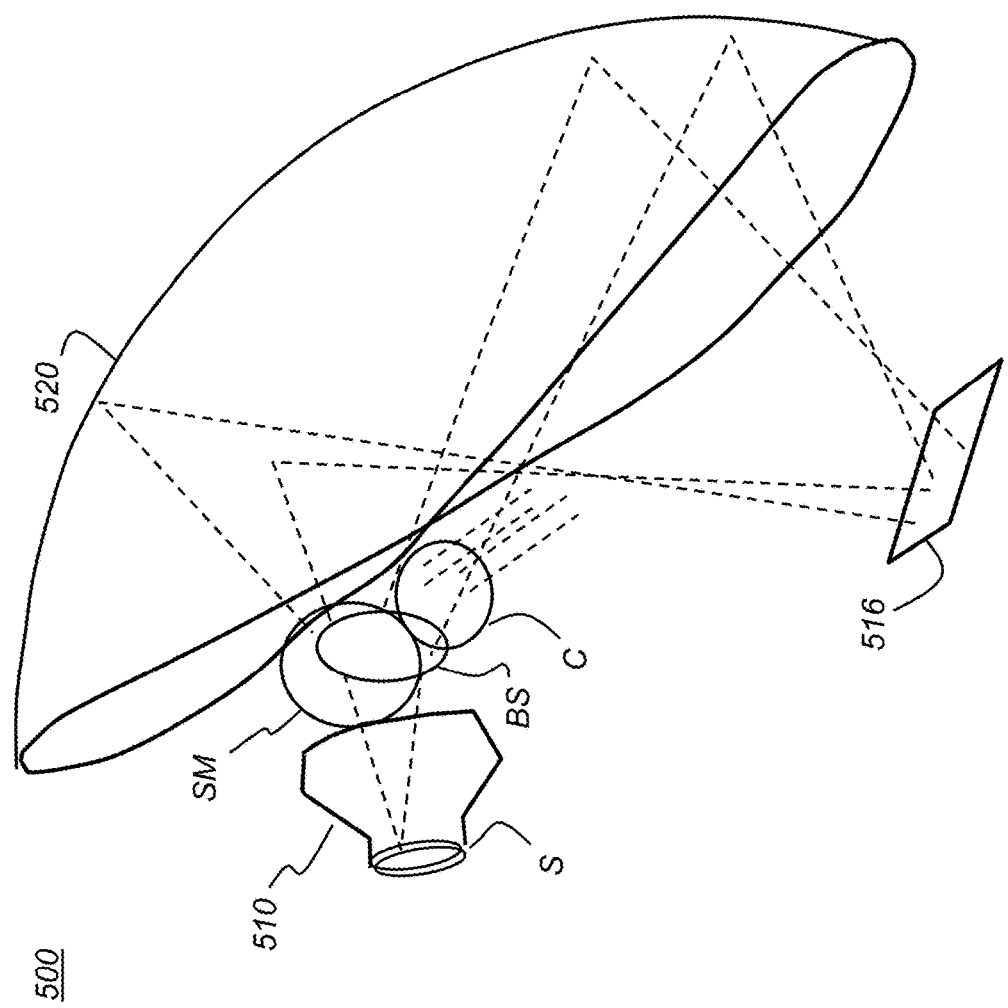

The schematic diagrams of FIGS. 5A, 5B, and 5C show a scanning microscope 500 having an objective 510 and support components configured to reduce the attenuation of signal light energy. FIG. 5A shows the path of the illumination or excitation signal, with expanded beam B directed through beam splitter BS and to scanning mirror SM. The scanned beam is directed toward objective 510 from beam splitter BS and then directed to sample S, as described in the preceding embodiments. For multiple-photon microscopy, the spectral range of the excitation or illumination signal is typically infrared (IR) with light having wavelengths generally above about 700 nm.

FIG. 5B shows the path of the excited or emitted signal light from the illuminated sample S. This excited signal light has wavelengths shorter than the excitation light, such as light having wavelengths generally below about 500 nm, in the range of blue or blue-green light, for example. The excited signal energy generally has a Lambertian distribution. The signal light is collected by objective 510 but does not follow the same light path of the focused illumination. The objective 510 and supporting optics include surfaces treated to have different reflection/transmission characteristics according to the wavelengths of incident light. The collected emitted light is directed past beam splitter BS and is reflected from a collection mirror 520 and toward a detector 516, which senses the level of the returned signal. Detector 516 can be disposed at an image of sample S with respect to mirror 520. The collector mirror 520 surface relays the exit aperture of the pancake optics to very near the location of surface L2 (FIG. 2) to detector 516. This large collector mirror can have a spherical, toroidal, or free-form surface. According to an embodiment of the present disclosure, collection mirror 520 can be an ellipsoid having two foci, one focus at the scanned sample S, the other focus at detector 516.

Beam splitter BS can be a dichroic beam splitter, for example.

FIG. 5C shows scanning microscope 500 from an alternate view.

For the embodiment shown in FIGS. 5A-5C, the spectral characteristics of partially reflective components within and supporting objective 510 are adjusted to selectively reflect or transmit light according to wavelength. One or more of the following modifications can be used for this purpose:
(i) changes to the coating characteristic of partially reflective mirror M1, maintaining partial reflection of illumination or excitation light wavelengths while reducing or eliminating reflection for excited signal wavelengths;
(ii) changes to the coating characteristic for the reflective polarizer used within objective 510, so that the polarizer transmits light of any polarization for signal wavelengths; and
(iii) changes to the coating characteristic for beam splitter BS to eliminate or significantly reduce reflection of signal wavelengths and increase signal transmission.

According to an embodiment of the present disclosure described previously, the modifications listed above change the behavior of scanning microscope 500 optics so that catadioptric objective 510 and its supporting optics are transmissive in the blue-green region and for shorter wavelengths, regardless of polarization state, such as more than 60% transmissive to the shorter signal wavelengths. Collection mirror 520, however, reflects at least the signal light wavelengths or can be reflective to all incident light regardless of wavelength.

The invention has been described in detail, and may have been described with particular reference to a suitable or presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A scanning microscope apparatus for acquiring an image of a sample, comprising:
   a) a source of laser light energizable to generate a beam having a beam width and an excitation wavelength range;
   b) a beam expander configured to enlarge the beam width of the laser light and to direct a collimated beam along a beam path;
   c) a scanner in the beam path and energizable to scan the beam in a raster pattern;
   d) a catadioptric objective that is disposed to receive the scanned beam,
   wherein the catadioptric objective comprises:
      (i) a curved, partially transmissive mirror surface that is symmetric about an optical axis and disposed to focus a portion of the received scanned collimated beam toward a focal plane at the sample,
      wherein the mirror surface has a center of curvature either at an axis of rotation of the scanner or at an image of the axis of rotation of the scanner;
      (ii) a reflective polarizer that is disposed in the path of both collimated light of a first polarization state and focused light of an orthogonal polarization state, wherein the reflective polarizer is configured to cooperate with the curved mirror surface to direct the focused light toward the sample;
      (iii) one or more polarization retarders disposed along the optical axis to condition excitation light that is conveyed toward and away from the curved mirror surface;
   and
   e) a first beam splitter configured to separate the generated laser light from a signal that is excited from the sample and to direct the excited signal toward a detector.

2. The apparatus of claim 1 wherein the scanner comprises:
   (i) a first scanning element for scanning with respect to a first scan axis; and (ii) a second scanning element for scanning with respect to a second scan axis that is perpendicular to the first scan axis; and further comprising an afocal relay disposed to optically co-locate the first and second scanning elements.

3. The apparatus of claim 1 further comprising an aspheric corrector in the beam path.

4. The apparatus of claim 3 further comprising an adaptive optical element in the beam path.

5. The apparatus of claim 4 further comprising an actuator that translates the aspheric corrector and the adaptive optical element along the beam path.

6. The apparatus of claim 1 wherein the curved mirror surface is concave toward the sample.

7. The apparatus of claim 1 wherein the curved mirror surface is concave toward the scanner.

8. The apparatus of claim 1 wherein the excited signal has a second wavelength range that is shorter than the excitation wavelength range and wherein the partially transmissive mirror surface transmits more than 60% of incident light within the second wavelength range.

9. The apparatus of claim 8 further comprising a second curved mirror surface outside the optical axis and disposed to cooperate with the first beam splitter and to direct the excited signal from the sample to the detector.

10. The apparatus of claim 9 further comprising an aspheric corrector in the laser beam path.

11. The apparatus of claim 9 wherein the detector is disposed at an image of the sample that is formed by the second curved mirror surface.

12. The apparatus of claim 1 further comprising a second beam splitter that is disposed to direct the collimated beam toward the scanner.

13. The apparatus of claim 1 wherein the generated excitation wavelength from the source of laser light is above 700 nm.

14. The apparatus of claim 1 wherein the catadioptric objective, the scanner, and the beam expander are disposed to direct the excited signal, at a wavelength below 600 nm, to the detector.

15. A scanning microscope apparatus for acquiring an image of a sample, comprising:
   a) a source of laser light energizable to generate a beam having a beam width and an excitation wavelength range;
   b) a beam expander configured to enlarge the beam width of the laser light and to direct a collimated beam along a beam path;
   c) a scanner in the beam path and energizable to scan the beam in a raster pattern, wherein the scanner comprises:
      (i) a first scanning element for scanning with respect to a first scan axis; and
      (ii) a second scanning element for scanning with respect to a second scan axis that is perpendicular to the first scan axis;
   d) an afocal relay disposed to optically co-locate the first scanning element that scans along the first axis and the second scanning element that scans along an orthogonal axis;
   e) a catadioptric objective that is disposed to receive the scanned beam, wherein the catadioptric objective comprises
      (i) a curved partially transmissive mirror surface symmetric about an optical axis and disposed to focus a portion of the received scanned collimated beam toward a focal plane at the sample, wherein the mirror surface has a center of curvature either at an axis of rotation of the scanner or at an image of the axis of rotation of the scanner;
      (ii) a reflective polarizer that is disposed in the path of both collimated light of a first polarization state and focused light of an orthogonal polarization state, wherein the reflective polarizer is configured to cooperate with the curved mirror surface to direct the focused light toward the sample;
      (iii) one or more polarization retarders disposed along the optical axis to condition excitation light that is conveyed toward and away from the curved mirror surface;
   and
   f) a first beam splitter configured to separate the generated laser light from a signal that is excited from the sample and to direct the excited signal toward a detector.

16. The apparatus of claim 15 wherein the reflective polarizer is a wire-grid polarizer.

17. A method for scanning a sample to acquire an image, the method comprising:
   a) energizing a source of laser light to generate a beam having a beam width and an excitation wavelength range;
   b) enlarging the beam width of the laser light and directing a collimated beam along a beam path;
   c) scanning the collimated beam in a raster pattern;
   d) disposing a catadioptric objective to receive the scanned beam, wherein the catadioptric objective comprises:
      (i) a curved partially transmissive mirror surface symmetric about an optical axis and disposed to focus a portion of the received scanned collimated beam toward a focal plane at the sample, wherein the mirror surface has a center of curvature either at an axis of rotation of the scanner or at an image of the axis of rotation of the scanner;
      (ii) a reflective polarizer that is disposed in the path of both collimated light of a first polarization state and focused light of an orthogonal polarization state, wherein the reflective polarizer is configured to cooperate with the curved mirror surface to direct the focused light toward the sample;
      (iii) one or more polarization retarders disposed along the optical axis to condition excitation light that is conveyed toward and away from the curved mirror surface;
   e) separating the generated laser light from a signal that is excited from the sample; and
   f) forming the image from the sample light.

18. The method of claim 17 further comprising translating an aspheric corrector and an adaptive optical element along the beam path to adjust focus at the catadioptric objective.

* * * * *